W. MOREHOUSE.
Carbureter.

No. 219,590.  Patented Sept. 16, 1879.

Witnesses:
Daniel Ruggles
J. P. Th. Lang.

Inventor:
William Morehouse
by Mason Fenwick Lawrence
Attorneys

UNITED STATES PATENT OFFICE.

WILLIAM MOREHOUSE, OF BUFFALO, NEW YORK.

IMPROVEMENT IN CARBURETERS.

Specification forming part of Letters Patent No. 219,590, dated September 16, 1879; application filed July 10, 1879.

*To all whom it may concern:*

Be it known that I, WILLIAM MOREHOUSE, of Buffalo, in the county of Erie, in the State of New York, have invented a new and useful Improvement in Street Coal Gas Carbureters; and I do hereby declare that the following is a full, clear, and exact description thereof, reference being had to the accompanying drawings, forming part of this specification, in which—

Figure 1:
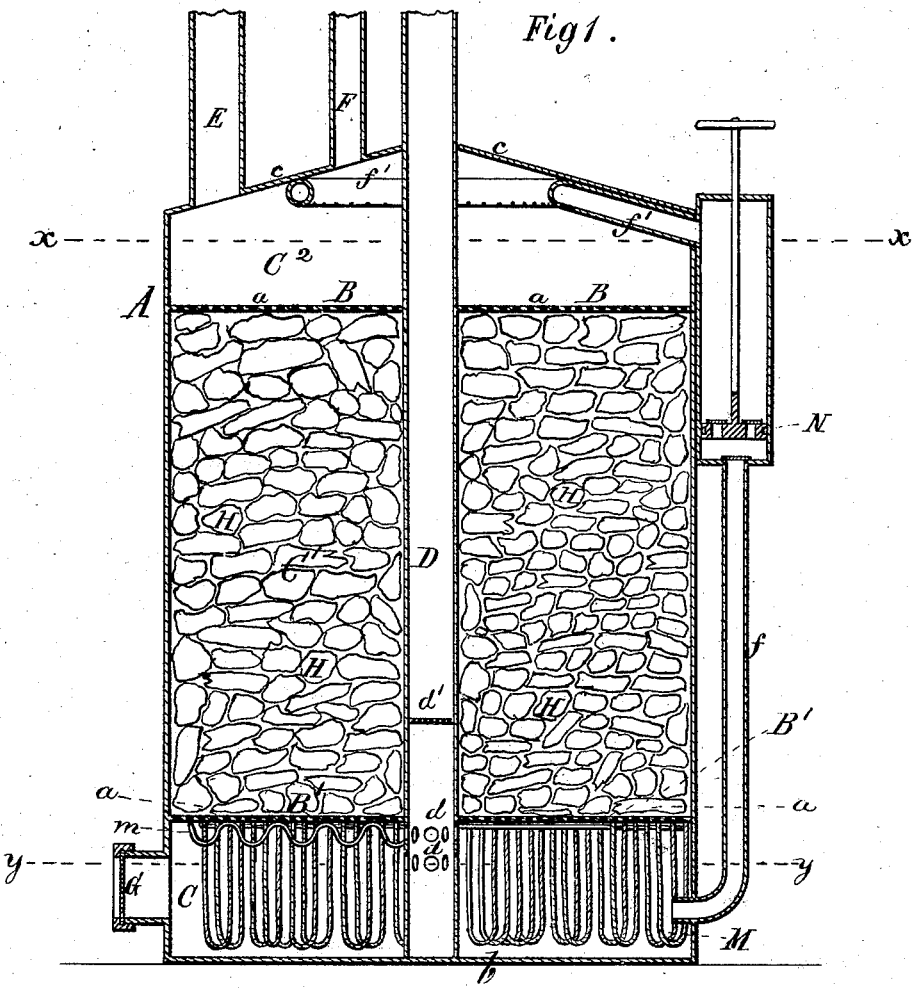
Figure 2:
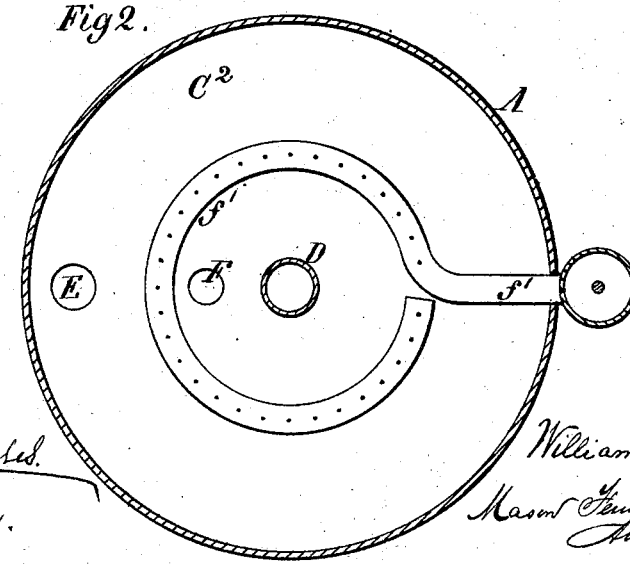

Figure 1 is a vertical central section of a street coal-gas carbureter constructed in accordance with my improvements. Fig. 2 is a horizontal section of the same in the line $x\,x$ of Fig. 1, looking upward.

The object of my invention is to more efficiently and in greater volume mingle the carbureting material with street coal-gas than can be effected by simply passing the gas through wicking saturated with the carbureting material, and at the same time provide a more ready escape for the carbureted gas from the carbureter into the distributing-pipes leading to the burners.

The nature of my invention consists, first, in a carbureter combining in its construction an outer jacket, horizontal perforated diaphragms, a bottom oil-chamber, an intermediate chamber for charcoal or other purifying material, and a top gas-chamber, which latter also serves as a circulation-chamber for the oil, and which carbureter is also provided with a central carbureted-gas discharge-pipe perforated below the bottom diaphragm, just above the level of the oil, and in communication with the distributing-pipes leading to the burners, and with an induction-pipe for the gas to be carbureted, an induction-pipe for the oil which is to serve as the carbureting agent, a suitable gage for indicating the height of the oil, and capillary wicks for taking up the oil for enriching the street-gas, all as will be hereinafter described.

Second, it consists in the combination, with the carbureter hereinafter described, of a pump for elevating the oil from the bottom or oil-holding chamber to the top or street-gas receiving-chamber, and distributing it into said chamber above the top perforated diaphragm, so that it may reflow down through a body of comminuted charcoal or other purifying material contained between the two diaphragms, thus resaturating the charcoal with carbureting material on its passage back into the oil-chamber, and insuring a thorough distribution of the carbureting agent amid the street-gas which is caused to flow down through the charcoal on its passage to the carbureted-gas discharge-pipe.

In the accompanying drawings, A represents the outer shell or casing of the carbureter, and B and B' the diaphragms, dividing it into three compartments, C C¹ C², of which C is the oil-chamber, C¹ the chamber for comminuted charcoal or other purifying material, and C² the street-gas receiving-chamber.

The diaphragms are finely perforated, as shown at $a$, and thus a communication is formed between the three chambers C C¹ C², and the gas or oil, separately or together, can pass from chamber C² down through the charcoal in chamber C¹ and into chamber C.

A central pipe, D, extends up from the bottom $b$ of the jacket A through the diaphragms B B' and top $c$ of the jacket A, as shown. This pipe is perforated just below the diaphragm B', as shown at $d$. The perforations $d$ do not extend down below the oil line or level $y\,y$. This pipe forms the escape or discharge passage for carbureted gas from the carbureter to the distributing-pipes and gas-burners of buildings or streets.

E is an induction-passage in the top $c$ of the carbureter for street-gas from a gas-meter; F, an induction-passage for the oil which is used for enriching or carbureting the street-gas, and G a glass gage for indicating the height of oil in the oil-chamber C.

In the chamber C¹ comminuted charcoal or other purifying material, as indicated at H, is placed for the purpose of purifying either the oil or gas, or both the mingled oil and gas, in its passage to the discharge-pipe D, such charcoal being thoroughly saturated with oil passed down through it and into the chamber C. In the oil-chamber C a number of capillary wicks, M, are suspended from a wire, $m$, attached to the under side of the diaphragm B'. These wicks dip down into the oil in chamber C, and conduct the oil to places in close proximity to the perforations $a$ of the diaphragm B', and by this means the gas which passes down through the charcoal H is further enriched by the oil imparted to it by the wicks in its passage through them on a plane above the level of the oil in the chamber C.

Attached to the carbureter described is a suction-pump, N, for elevating oil from the chamber C into the street-gas receiving-chamber $C^2$, and distributing it upon the charcoal for the purpose of resaturating the charcoal periodically, as desired.

In the use of the carbureter it becomes necessary to resaturate the charcoal in order to enrich the gas commensurate with the number of burners which may be in use; and for this purpose, instead of drawing out the oil from the chamber C and pouring it into the chamber $C^2$, which would necessitate the cutting off of the gas from the carbureter, the pump is employed for lifting the oil out of the chamber C into the chamber $C^2$, and thus redistribute it upon the charcoal under force sufficient to overcome the pressure of the gas from the meter.

It will be seen that the gas, in passing downward through the charcoal H and in contact with the wicks M, is enriched with oil and cleansed from impurities. Further, that the carbureted gas has an immediate unobstructed escape through apertures $d$ at a point between the diaphragm $B'$ and the body of oil in chamber C, and thence a free exit through pipe D to the distributing-pipes and burners.

Ordinarily the apparatus works well as described; but in instances where it is found that the gas becomes too heavily carbureted it is practicable with the pipe D to interpose an agent for finally purifying such gas, and to this end a perforated diaphragm, $d'$, is employed, and upon it lime or charcoal, or both mixed, is placed.

I am aware that central pipes operating as a siphon have been employed to discharge the gas in a downward direction. Such construction in carbureters I do not claim.

I also am aware that pumps have been combined with carbureters which required the gases to be forced and the fluids to be circulated continuously. Such combination I do not claim, as my pump operates only periodically for the purpose of elevating an accumulated quantity of oil, for the purpose of saturating the charcoal used for purifying, and for aiding in carbureting the gas by distributing the oil over a greater area or surface.

What I claim as my invention is—

1. The carbureter consisting of a combination of the outer jacket, A, perforated diaphragms B $B'$, oil, charcoal, and gas chambers C $C^1$ $C^2$, supplied respectively with oil, wicks, charcoal, and gas, the central pipe, D, perforated at $d$, below the diaphragm $B'$, a gage, G, and induction gas and oil pipes E and F, substantially as described.

2. The combination, with the street-gas carbureter described, consisting, mainly, of an outer jacket, A, perforated diaphragms B $B'$, oil, charcoal, and gas chambers C $C^1$ $C^2$, and a central pipe, D, perforated at its lower end and connected by its upper end with the pipes leading to the burners of a dwelling or building, of the pump N, provided with a circularly bent and perforated pipe, $f'$, for elevating the oil from chamber C into chamber $C^2$ and distributing it upon the perforated diaphragm B, for the purpose of resaturating the charcoal in chamber $C^1$, substantially as described.

3. The single central tube, D, perforated at $d$, open and discharging at top into the burner-pipes, in combination with the chambers C, $C^1$, and $C^2$, jacket A, substantially as and for the purpose described.

WILLIAM MOREHOUSE.

In presence of—
 CHARLES L. HARPER,
 FRANK X. WANENMACHER.